United States Patent Office 3,230,068
Patented Jan. 18, 1966

3,230,068
METHOD FOR RETARDING THE GROWTH OF CRABGRASS
Raymond W. Luckenbaugh, Wilmington, Del., assignor to E. I. du Pont de Nemours and Company, Wilmington, Del., a corporation of Delaware
No Drawing. Filed July 26, 1963, Ser. No. 297,971
7 Claims. (Cl. 71—2.3)

This invention relates to a method of destroying weeds. More specifically, it refers to a method of retarding the growth of crabgrass by applying a growth retardant amount of a 1-(cycloalkyl)-3-phenyl carbodiimide to germinating and seedling crabgrass plants.

I have discovered that by applying such a cycloalkylphenyl carbodiimide in a pre-emergence or post-emergence treatment to an area in which crabgrass is growing there results a marked growth retardation of the germinating or seedling crabgrass plant. This retardation of growth is caused by the effect on crabgrass root system. The crabgrass root system fails to grow and develop in a normal manner. Established turf grasses such as Kentucky bluegrass, bentgrass, and creeping fescues show only slight retardation of growth and no injury. Therefore, crabgrass growing in a lawn treated with a compound used in this invention is soon crowded out by desirable plants or destroyed by lack of an adequate supply of water and minerals necessary to sustain life.

It is well recognized by home lawn owners that crabgrass is one of the most difficult weeds to eliminate from a lawn. Its branching root system firmly anchors the plant in the soil. Minerals and water needed by lawn grasses are used for the growth of the crabgrass plant and the development of lawn grasses in the immediate area of the crabgrass is slowed. By applying a compound used in my invention, home lawn owners can now plant lawn seeds in the spring without fear that crabgrass will crowd out lawn grasses before they become established.

A compound used in this invention can be applied to the area of the newly planted grass seeds to retard crabgrass emergence and allow the desirable emerging perennial lawn grasses to crowd out the crabgrass. If crabgrass appears on already established turf, an application of a compound used in this invention will retard the growth of the emerged crabgrass so that the established lawn grasses can crowd out the crabgrass.

Specifically, the compounds used in this invention are represented by the formula:

(1)

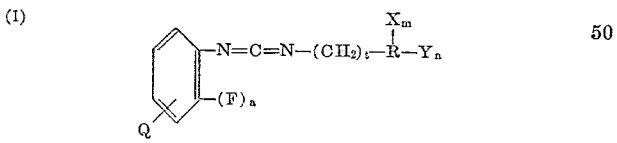

wherein

R is a saturated cycloalkyl group containing 5 through 8 carbon atoms or saturated bicycloalkyl group of 7 through 8 carbon atoms;
X and Y are the same or different and are halogen, methyl or ethyl;
$a$ is 0 or 1;
$t$ is 0 or 1;
$m$ is 0 or 1;
$n$ is 0 or 1;
Q is hydrogen or methyl and with the limitation that when R is cyclopentyl, cycloheptyl, cyclooctyl or bicycloalkyl, Q must be in the meta position and X and Y are halogen or methyl.

The substituted and unsubstituted cyclopentyl- and cyclohexylphenyl carbodiimides cause marked growth retardation of crabgrass growing in established lawns containing perennial grasses.

The cyclohexylphenyl carbodiimides of the following structure exhibit outstanding selectivity in retarding the growth of crabgrass around dicotyledonous plants and desirable perennial grasses.

(2)

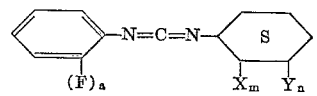

wherein

X and Y are the same or different and are halogen, methyl or ethyl;
$a$, $m$ and $n$ are each 0 or 1.

The 1-(methylcycloalkyl)-3-phenyl carbodiimides are safe to use at even high rates on Kentucky bluegrass, bentgrass and creeping red fescue.

The 1-cycloalkyl-3-(m-tolyl)carbodiimides will retard the growth of crabgrass in established Bermuda grass lawns without deleterious effect on the Bermuda grass.

The 1-(methylcycloalkyl)-3-(m-tolyl)carbodiimides retard crabgrass growth in agronomic and horticultural crops.

The 1-cycloalkyl-3-o-fluorophenyl carbodiimides of the following formula are particularly effective in retarding the growth of crabgrass without having an effect on other common lawn grasses.

(3)

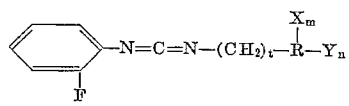

wherein

X, Y, $t$, $m$ and $n$ are the same as in Formula 1 except at least one of $m$ and $n$ is 1 when $t$ is 0.

Particularly preferred compounds because of their outstanding action in retarding the growth of crabgrass at extremely low rates are:

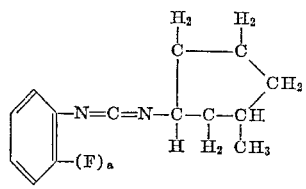

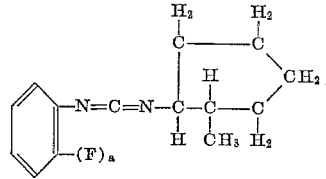

wherein $a$ is 0 or 1.

PREPARATION

Carbodiimides used in this invention are prepared by a two step reaction as follows:

(1)

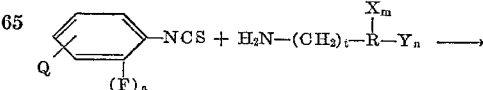

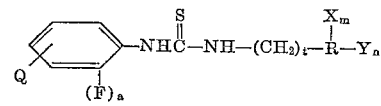

(2)

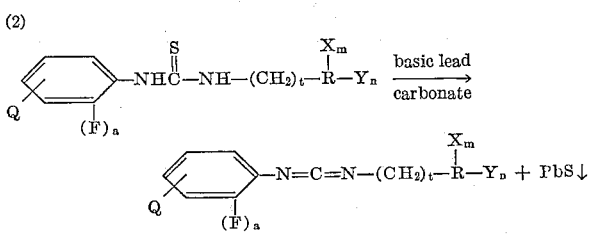

wherein

Q, R, X, Y, a, t, m and n have the same meaning as in Formula 1.

The preparation of the thioureas is a well known reaction in the art. See U.S. Patent No. 2,661,272 issued December 1, 1963, and U.S. Patent No. 2,723,192 issued November 8, 1955.

The second step of the reaction can be performed by any of the conventional methods of removing hydrogen sulfide from a thiourea. Basic lead carbonate can be used successfully in refluxing benzene. Other methods are described in Chem. Reviews 53, 145 (1953), and in U.S. Patent No. 2,479,498 issued August 16, 1949.

Mixtures of isomers can also be used in the procedures of this invention. The economical means of preparing the cycloalkylamines, such as 2- or 3-methylcyclohexylamine, results in a mixture of cis and trans isomers. No separation of the isomers is needed, either in the thiourea intermediates or in the final carbodiimides.

The 1-cycloalkyl-3-phenylcarbodiimides of this invention have contact herbicidal action on the foliage of the undesirable annual grasses. They are non-polar in nature. Therefore they penetrate the foliage more rapidly than the corresponding substituted ureas to which they are hydrolyzed.

COMPOSITIONS

In a preferred composition according to this invention, the compound having the formula shown above is dissolved in an inert substituted or unsubstituted aliphatic or aromatic organic liquid diluent, the compound of this invention being present in sufficient amount to produce a herbicidal effect. The compounds are usually formulated as oil concentrates for ease of handling, the active ingredient being present in from 5% to 98% by weight and preferably 25% to 95%. This concentrated formulation can be used in some instances without dilution, but in most cases it will be more convenient to dilute further with hydrocarbon oils for more uniform coverage. The actual spray concentration will be less than 50% and ordinarily will range from 0.25% to 10% for most applications.

The liquid compositions including the compounds of this invention can be prepared by admixing the compound with the selected inert organic liquid solvent. By inert is meant that the solvent does not have any active hydrogen atoms or other reactive groupings. These oils should be free of water to prevent premature hydrolysis of the cycloalkylphenyl carbodiimide derivative and resultant separation of the corresponding substituted urea herbicide from the formulation. This inert characteristic of the solvent is essential in order that the solvent does not cause any decomposition or other reaction that would interfere with the herbicidal activity of the composition or result in the formation of undesired by-products.

Within the description of the inert organic liquid diluent just given, the particular diluent can be selected readily by persons in the art in accordance with such factors as the conditions of storage, the economics of the materials, the climate and in particular the temperature of manufacture, storage and use, safety and ease in handling, the method in which the composition is to be applied to the areas to be protected, the nature of the effect desired, etc.

A large number of aliphatic and aromatic hydrocarbons can be used as solvents for compounds of the present invention. Typical examples are the octanes and higher molecular weight aliphatic hydrocarbons, benzene, toluene, xylene, ethylbenzene, diethylbenzene, cumene, cymene, butylbenzenes, alkylated naphthalenes and higher molecular weight aromatic hydrocarbons. Particularly suitable are mixtures of such hydrocarbons. Typical of the hydrocarbon mixtures that can be used are diesel oils, fuel oils, kerosenes, paraffin and isoparaffin oils, Stoddard solvent and the like. Some oils can only be used as directed crop sprays. These include the commercial herbicidal oils such as "Lion Herbicidal Oil No. 6" and "Conoco Weed Oil." Preferably the hydrocarbons used have a boiling point from 100° to 400° C., since lower boiling hydrocarbons present a serious fire hazard.

Chlorinated aliphatic and aromatic hydrocarbons are also suitable and can in some cases be especially advantageous because of the reduced fire hazard. Typical examples are tetrachloroethylene, trichloroethylene, ethylene dichloride, dichloropropane, dichlorobutane, dichloropentane, vinyl chloride, vinylidene chloride, trichloroethane, tetrachloroethane, methylene chloride, chloroform, carbon tetrachloride, chlorobenzene, dichlorobenzene and chlorotoluene. The commercially available chlorofluorocarbons can be used in certain specific formulations notably in propellant compositions. Examples of such chlorofluorocarbons are chlorodifluoromethane, dichlorodifluoromethane, fluorotrichloromethane and tetrafluorodichloroethane.

There are numerous other inert organic diluents suitable for use in this invention. Among them are such compounds as nitrobenzene, bromobenzene and dibromobenzene.

Preferred diluents are xylene, chlorobenzene, alkylated naphthalenes, diesel oils, fuel oils, kerosenes, paraffin oils and the commercial herbicidal oils including those aforementioned. It will be obvious to persons in the art that other diluents can be used. Because of such factors as cost, toxicity, combustibility, or other undesirable property, some diluents are less preferred than others.

It is also possible to mix a relatively concentrated oil solution of the compounds used in this invention with water just prior to ejection from the spray nozzle in certain applications.

Another composition of my invention comprises a compound of Formula 1 in admixture with an inert granular carrier. Such granules can be applied from conventional granule applicators set for agricultural or lawn use. The granular carrier can comprise inert preferred granules, such as Vermiculite or granular attapulgite. To prepare granules, the active ingredient, in solution or in the molten state, can be sprayed over the carrier. Alternatively the compounds can be comminuted, if necessary, in the presence of an inert grinding aid, mixed with the granules, and then fixed with a binder such as an inert non-volatile liquid or a suitable surface-active agent. Granules can also be prepared by mixing and grinding the active ingredient with a granulating clay, and granulating the mixture by adding a suitable inert liquid such as an oil or a surfactant and tumbling the mass. Other ingredients such as desiccants, dyes, pigments and the like can also be present in the granular compositions.

Particularly outstanding compositions of this invention contain 0.1 to 10% by weight of inert surface-active agents which are substantially free of active hydrogens. Preferred among these are the non-ionic polyethylene glycol diesters with fatty acids, such as polyethylene glycol 400 dilaurate and polyethylene glycol dioleate.

Compositions according to this invention can also include various other ingredients such as corrosion inhibitors, dehydrating agents, and the like, as will be readily understood. Such additives will of course be compatible with the other ingredients in the composition, usually soluble in the particular solvent used, and similarly non-reactive with the cycloalkylphenyl carbodiimides. Suitable corrosion inhibitors include anhydrous quaternary ammonium salts, such as cetyltrimethylammonium chloride, triesters of phosphoric acid, such as tricresyl phosphate, and certain tertiary amines such as triphenylamine.

Particularly useful dehydrating agents include anhydrous magnesium sulfate, anhydrous calcium sulfate and silica gel. Some of these drying agents do not, of course, dissolve in the solutions of my invention.

APPLICATION

The compounds of this invention are applied directly to the soil as pre-emergence or as post-emergence treatments to crabgrass foliage or they can be mixed intimately with the soil. Rates of application can be in the range of ½ to 20 pounds per acre and will preferably be used at the rate of 1 to 15 pounds per acre. Rates as high as 24 pounds have been used in tests on established turf grasses without undesirable injury.

More specifically, as a pre-emergence application on crop lands, 2 to 8 pounds per acre of a compound used in this invention will retard the growth of crabgrass. There is a good safety margin to crop plants such as cucumbers, cotton, potatoes, flax, squash, lima beans, corn, eggplants, red clover, rye grass, tomatoes, lespedeza, peppers, soybeans, red beets, alfalfa, sugar beets, green beans, carrots, peanuts, okra and the like. The crabgrass usually makes an appearance above the ground and then fails to develop, showing symptoms of severe growth retardation. It is particularly surprising to note that the compounds used in the invention retard crabgrass growth without harming cultivated annual grasses such as rye grass.

As an application on established growing lawns before the crabgrass appears, growth is retarded with 2 to 16 pounds of active ingredient per acre. There is no injury to established Kentucky bluegrass, bentgrass, or creeping red fescue growing from rhizomes. The crabgrass makes an appearance above the soil and then fails to develop.

As an application on lawn areas, after seeding the lawn grasses and before the lawn grasses and crabgrass have appeared, 2 to 8 pounds of active ingredient per acre prevents the development of crabgrass. There is no undesirable effect on the development of Kentucky bluegrass, bentgrass or creeping red fescue.

As a directed post-emergence application on crop lands at any time from the moment the plants emerge to the three-leaf stage, 2 to 8 pounds per acre of active ingredient will prevent the further development of crabgrass. There is no perceptible injury to crop plants such as cucumbers, cotton, potatoes, flax, squash, lima beans, eggplant, red clover, tomatoes, lespedeza, peppers, soybeans, red beets, alfalfa, sugar beets, green beans, carrots, peanuts, okra, corn and the like.

As an application on newly seeded lawns after the lawn grasses and crabgrass have appeared, 2 to 8 pounds of active ingredient will prevent the further development of crabgrass. There is no perceptible injury to Kentucky bluegrass, bentgrass or creeping red fescue.

As an application on established lawns after the crabgrass appears at emergence to 3-leaf stage, 3 to 16 pounds per acre of active ingredient will prevent the further development of crabgrass without injury to the established lawn grasses.

The compounds of this invention can also be applied admixed or in common solution with other chemicals which are used in agronomic and horticultural management and are compatible with the compounds of this invention. Such chemicals may be, but are not restricted to, the classes of chemicals common known as plant nutrients, fertilizers, insecticides, fungicides, herbicides and nematocides. Typical of the insecticides that can be used are:

1,2,3,4,10,10-hexachloro-6,7-epoxy-1,4,4a,5,6,7,8,8a-octahydro-1,4,5,8-dimethanonaphthalene (dieldrin),
1,2,4,5,6,7,8,8-octachloro-4,7-methano-3a,4,7,7a-tetrahydroindane (chlordane),
1,1,1-trichloro-2,2-bis(p-methoxyphenyl)ethane (methoxychlor),
1,1,1-trichloro-2,2-bis(p-chlorophenyl)ethane (DDT), and
1-naphthyl-N-methylcarbamate ("Sevin").

Fungicides that can be used in conjunction with the compounds of this invention include:

Metal salts of ethylene bisdithiocarbamic acid, e.g. sodium, manganese, zinc and iron salts;
N-trichloromethylmercapto-4-cyclohexene-1,2-dicarboximide;
N-trichloromethylthiophthalimide;
2,3-dichloro-1,4-naphthoquinone;
2,3,5,6-tetrachloro-1,4-benzoquinone;
2,4-dichloro-6-(o-chloranilino)-s-triazine;
Copper A;
Metal salts of alkyl and dialkyl dithiocarbamic acid, e.g., Zn, Na, K, Fe, Mn, Ni;
Zinc pyridinethione;
S-(1-oxido-2-pyridyl)-isothiuronium chloride;
Tetramethylthiuram disulfide;
Hydroxymercurichlorophenol and mixtures of these last two.

When present in compositions of this invention the above-described fungicides will be present at the rate of .02 to 10 parts by weight based on the weight of the cycloalkylphenyl carbodiimides present in the invention.

The control of crabgrass with cycloalkylphenyl carbodiimides often can be advantageously accomplished together with the use of conventional herbicides in situations where crabgrass is growing with weeds controlled by the second herbicide.

Illustrative of herbicides that can be used in conjunction with the compounds of this invention in sprays and granular formulations to take weeks out of desirable plants are the following:

| Herbicide | Desirable Plants |
|---|---|
| 1-3 lbs./acre of 2,4-dichlorophenoxyacetic acid | Lawn turf grasses. |
| 0.3-1 lb./acre of 2,4,5-trichlorophenoxyacetic acid | Do. |
| 0.5-1.5 lbs./acre of 2,4,5-trichlorophenoxyacetic acid. | Do. |
| 1-2 lbs./acre of 1-n-butyl-1-methyl-3-(3,4-dichlorophenyl) urea. | Do. |

Where the above are acidic they should be in the form of non-volatile ester formulations. Also contact herbicides may be included, such as cacodylic acid, potassium cyanate, dinitro-sec.-butyl phenyl, 1,1'-ethylene-2,2'-bipyridylium dibromide (diquat) and 1,1'-dimethyl-4,4'-bipyridylium dichloride (paraquat).

It is understood that the compounds and compositions of this invention are applied to the "locus" of the crabgrass growth. By "locus" is meant the plant itself when visible above the ground and when the plant is not visible the immediate area of soil where the crabgrass seed is present or where the plant is developing.

The following additional examples, in which all percents unless otherwise specified are by weight, are provided so as to more clearly explain this invention.

*Example 1*

A one liter flask equipped with a stirrer and a Dean-Stark trap to collect water is charged with 46.8 parts by weight of 1-cyclohexyl-3-phenyl-2-thiourea, 60 parts of basic lead carbonate (Mallinchrodt Analytical Reagent), and 400 parts of benzene. The mixture is refluxed for 24 hours and a total of 3.4 parts of water is collected. The reaction mixture is filtered and the benzene is evaporated. The crude oil, 33 parts by weight, is distilled in vacuum at reduced pressure. There is obtained 14.1 parts of essentially pure 1-cyclohexyl-3-phenyl carbodiimide, B.P. 102–109°/0.20–0.45 mm., $n_D^{25}$ 1.5626. The infrared spectrum shows a strong peak for the —N=C=N— bonds at 4.75μ.

*Analysis.*—Calc'd for $C_{13}H_{16}N_2$: Percent C, 78.0; percent H, 8.0. Found: Percent C, 75.7; percent H, 7.9.

Example 2

By a similar procedure as in Example 1, 29.7 parts by weight of 1-(2-methylcyclohexyl)-3-phenyl-2-thiourea, 38 parts of basic lead carbonate, and 250 parts of benzene are refluxed for 25 hours and 2 parts of water collected. After filtering through a Cilete bed the filtrate is evaporated. The crude oil, 27.5 parts by weight, is distilled in vacuo at reduced pressure. There is obtained 4.5 parts of essentially pure 1-(2-methylcyclohexyl)-3-phenylcarbodiimide, $n_D^{25}$ 1.5621.

*Analysis.*—Calc'd for $C_{14}H_{18}N_2$: Percent C, 78.5; percent H, 8.5; percent N, 13.1. Found: Percent C, 74.8; percent H, 8.3; percent N, 12.7.

By the above procedure using like amount by weight of the following thioureas the corresponding carbodiimides are obtained.

TABLE I (EXAMPLES 3–29)

| Ex. | Thioureas | Carbodiimides |
|---|---|---|
| 3 | 1-cycloheptyl-3-phenyl-thiourea. | 1-cycloheptyl-3-phenyl-carbodiimide. |
| 4 | 1-cyclooctyl-3-phenyl-thiourea. | 1-cyclooctyl-3-phenylcarbodiimide. |
| 5 | 1-cyclopentyl 1-3-phenyl-thiourea. | 1-cyclopentyl-3-phenylcarbodiimide. |
| 6 | 1-(3-methylcyclohexyl)-3-phenylthiourea. | 1-(3-methylcyclohexyl)-3-phenylcarbodiimide. |
| 7 | 1-(cyclohexylmethyl)-3-phenylthiourea. | 1-(cyclohexylmethyl)-3-phenylcarbodiimide. |
| 8 | 1-(2-chlorocyclohexyl)-3-phenylthiourea. | 1-(2-chlorocyclohexyl)-3-phenylcarbodiimide. |
| 9 | 1-methylcyclooctyl-3-phenylthiourea. | 1-methylcyclooctyl-3-phenylcarbodiimide. |
| 10 | 1-(2,4-dimethylcyclohexyl)-3-phenylthiourea. | 1-(2,4-dimethylcyclohexyl)-3-phenylcarbodiimide. |
| 11 | 1-(2-bromocyclohexyl)-3-phenylthiourea. | 1-(2-bromocyclohexyl)-3-phenylcarbodiimide. |
| 12 | 1-(dichlorocyclohexyl)-3-phenylthiourea. | 1-(dichlorocyclohexyl)-3-phenylcarbodiimide. |
| 13 | 1-(2-methylcyclohexyl)-3-(o-fluorophenyl)-thiourea. | 1-(2-methylcyclohexyl)-3-(o-fluorophenyl)-carbodiimide. |
| 14 | 1-(3-methylcyclohexyl)-3-(o-fluorophenyl)-thiourea. | 1-(3-methylcyclohexyl)-3-(o-fluorophenyl)-carbodiimide. |
| 15 | 1-cyclooctyl-3-(o-fluorophenyl)thiourea. | 1-cyclooctyl-3-(o-fluorophenyl)-carbodiimide. |
| 16 | 1-cyclohexyl-3-(o-fluorophenyl)thiourea. | 1-cyclohexyl-3-(o-fluorophenyl)carbodiimide. |
| 17 | 1-(cyclohexylmethyl)-3-(o-fluorophenyl)-thiourea. | 1-(cyclohexylmethyl)-3-(o-fluorophenyl)-carbodiimide. |
| 18 | 1-(2-methylcyclohexyl)-3-m-tolylthiourea. | 1-(2-methylcyclohexyl)-3-m-tolylcarbodiimide. |
| 19 | 1-(3-methylcyclohexyl)-3-m-tolylthiourea. | 1-(3-methylcyclohexyl)-3-m-tolylcarbodiimide. |
| 20 | 1-(3-methylcyclohexyl)-3-o-tolylthiourea. | 1-(3-methylcyclohexyl)-3-o-tolylcarbodiimide. |
| 21 | Endo-1-(2-norbornyl)-3-phenylthiourea. | Endo-1-(2-norbornyl)-3-phenylcarbodiimide. |
| 22 | Exo-1-(2-norbornyl)-3-phenylthiourea. | Exo-1-(2-norbornyl)-3-phenylcarbodiimide. |
| 23 | 1-(3-methyl-2-norbornyl)-3-phenylthiourea. | 1-(3-methyl-2-norbornyl)-3-phenylcarbodiimide. |
| 24 | 1-(1,7-dimethyl-2-norbornyl)-3-phenylthiourea. | 1-(1,7-dimethyl-2-norbornyl)-3-phenylcarbodiimide. |
| 25 | 1-(chloronorbornyl)-3-phenylthiourea. | 1-(chloronorbornyl)-3-phenylcarbodiimide. |
| 26 | 1-(2-ethylcyclohexyl)-3-phenylthiourea. | 1-(2-ethylcyclohexyl)-3-phenylcarbodiimide. |
| 27 | 1-(2-methylcyclohexyl)-3-p-tolylthiourea. | 1-(2-methylcyclohexyl)-3-p-tolylcarbodiimide. |
| 28 | 1-(2-methylcyclohexyl)-3-o-tolylthiourea. | 1-(2-methylcyclohexyl)-3-o-tolylcarbodiimide. |
| 29 | 1-(3-methylcyclohexyl)-3-cyclohexylmethylthiourea. | 1-(3-methylcyclohexyl)-3-cyclohexylmethylcarbodiimide. |

Example 30

| | Percent |
|---|---|
| 1-(2-methylcyclohexyl)-3-phenylcarbodiimide | 90 |
| Monochlorobenzene | 10 |

This liquid composition is extended with diesel oil at a concentration of 6 pounds of the composition in 20 gallons of oil and applied at a rate of 5.4 pounds per acre of active material to a field of newly planted cotton. This application gives excellent control of any emerged grass weeds such as crabgrass and yellow foxtail with normal growth of the cotton plants. In addition, a pre-emergence effect is obtained on grass weeds that have not emerged at the time of application.

Example 31

| | Percent |
|---|---|
| 1-(2-methylcyclohexyl)-3-o-fluorophenylcarbodiimide | 25 |
| Xylene | 75 |

The solution is applied in 10 gallons of diesel oil as a directed post-emergence spray at a rate of 8 pounds per acre of active ingredient for control of seedling crabgrass, barnyard grass, and Japanese millet in a nursery that contains arbor vitae, privet, Norway spruce, and Euonymous. Excellent weed control is obtained without injury to the ornamental plantings.

Examples 32–54

The following compounds are substituted one at a time for the 1-(2-methylcyclohexyl)-3-phenyl carbodiimide in Example 31 in like amount by weight and are formulated and applied in like manner. Like results are obtained.

Example:
32. 1-(2-methylcyclohexyl)-3-m-tolylcarbodiimide
33. 1-(2-chlorocyclohexyl)-3-m-tolylcarbodiimide
34. 1-(2-chlorocyclohexyl)-3-phenylcarbodiimide
35. 1-(2-bromocyclohexyl)-3-phenylcarbodiimide
36. 1-(2-chlorocyclooctyl)-3-phenylcarbodiimide
37. 1-(dibromocyclooctyl)-3-phenylcarbodiimide
38. 1-(methylcyclooctyl)-3-phenylcarbodiimide
39. 1-(2,5-dimethylcyclooctyl)-3-phenylcarbodiimide
40. 1-(2-fluorocyclooctyl)-3-phenylcarbodiimide
41. 1-(dichlorocyclooctyl)-3-phenylcarbodiimide
42. 1-(2-chlorocycloheptyl)-3-phenylcarbodiimide
43. 1-(dichlorocycloheptyl)-3-phenylcarbodiimide
44. 1-(2-bromocycloheptyl)-3-phenylcarbodiimide
45. 1-(2-methylcycloheptyl)-3-phenylcarbodiimide
46. 1-cyclohexyl-3-phenylcarbodiimide
47. 1-[2-(cis),4(trans)-dimethylcyclohexyl]-3-phenylcarbodiimide
48. 1-[2(trans),4(cis)-dimethylcyclohexyl]-3-phenylcarbodiimide
49. 1-cis(2-methylcyclohexyl)-3-phenylcarbodiimide
50. 1-trans(2-methylcyclohexyl)-3-phenylcarbodiimide
51. 1-cis(3-methylcyclohexyl)-3-phenylcarbodiimide
52. 1-trans(3-methylcyclohexyl)-3-phenylcarbodiimide
53. 1-cis(4-methylcyclohexyl)-3-phenylcarbodiimide
54. 1-trans(4-methylcyclohexyl)-3-phenylcarbodiimide

Example 55

The following oil can be extended with other oils:

| | Percent |
|---|---|
| 1-(3-methylcyclohexyl)-3-phenylcarbodiimide | 20 |
| Polyethylene glycol 400 dilaurate | 2 |
| Oil soluble sulfonates | 3 |
| Alkylated naphthalene (principally α-methylnaphthalene) | 75 |

The above components are blended and agitated until a homogeneous mixture is obtained.

This emulsifiable formulation is extended with 80 gallons of herbicidal oil and applied at the rate of 12 pounds of active ingredient per acre to a brick walk infested with crabgrass. Excellent growth regulation of crabgrass is obtained. Weed seeds germinating after treatment show severe retardation.

*Examples 56–65*

The following compounds are substituted one at a time for the 1-(3-methylcyclohexyl)-3-phenylcarbodiimide in Example 56 in like amount by weight and are formulated and applied in like manner. Like results are obtained.

Example:
56. 1-norbornyl-3-phenylcarbodiimide
57. 1-norbornyl-3-m-tolylcarbodiimide
58. Endo-1-(2-norbornyl)-3-phenylcarbodiimide
59. Exo-1-(2-norbornyl)-3-phenylcarbodiimide
60. 1-(3-methyl-2-norbornyl)-3-phenylcarbodiimide
61. 1-(1,7-dimethyl-2-norbornyl)-3-phenylcarbodiimide
62. 1-(3,3-dimethyl-2-norbornyl)-3-phenylcarbodiimide
63. 1-(5,5-dimethyl-2-norbornyl)-3-phenylcarbodiimide
64. 1-(chloronorbornyl)-3-phenylcarbodiimide
65. 1-(dichloronorbornyl)-3-phenylcarbodiimide

*Example 66*

| | Percent |
|---|---|
| 1-(2-methylcyclohexyl)-3-phenylcarbodimide | 25 |
| "Freon" propellent | 25 |
| "Freon 12" propellent | 25 |
| Methylene chloride | 15 |
| Xylene | 10 |

This composition is pressure-packed under rigidly anhydrous conditions into an aerosol bomb. It is applied as a "spot spray" application at 8 pounds per acre of active ingredient for the control of crabgrass in bluegrass turf.

*Example 67*

The following granular formulation has general application to the cycloalkylphenyl carbodiimide used in this invention.

| | Percent |
|---|---|
| 1-(2-methylcyclohexyl)-3-phenylcarbodiimide | 2 |
| No. 4 vermiculite | 90 |
| Anhydrous magnesium sulfate | 3 |
| Polyethylene glycol 400 dilaurate | 5 |

The active material can be applied to the vermiculite in several ways. (1) The active material may be dissolved in a volatile solvent such as acetone and sprayed on the tumbling granules, or (2) A mixture of active ingredient and anhydrous magnesium sulfate is mixed with the vermiculite by brief tumbling. By adding the polyethylene glycol 400 dilaurate dusting off is prevented. In other granular formulations, if the melting point of the active ingredient is below about 99° C., the active ingredient can be melted and sprayed over a tumbling mass of preferred clay-, vermiculite-, or similar granules.

This granular formulation is applied pre-emergence with a granule spreader at the rate of 5–10 pounds of active ingredient per acre for the control of growth of crabgrass in an established bluegrass-meadow fescue lawn. The crabgrass emerges from the soil but fails to grow. The established lawn grasses show slight retardation with no objectionable injury.

*Examples 68–140*

The following compounds are substituted one at a time for the 1-(2-methylcyclohexyl)-3-phenyl carbodiimide in Example 68 in like amount by weight and are formulated and applied in like manner. Like results are obtained.

Example:
68. 1-cyclopentyl-3-m-tolylcarbodiimide
69. 1-(3-methylcyclohexyl)-3-m-tolylcarbodiimide
70. 1-(2-methylcyclohexyl)-3-m-tolylcarbodiimide
71. 1-cycloheptyl-3-m-tolylcarbodiimide Example:—*Continued*
72. 1-(2-chlorocyclohexyl)-3-m-tolylcarbodiimide
73. 1-(2-bromocyclooctyl)-3-phenylcarbodiimide
74. 1-(2-iodocyclooctyl)-3-phenylcarbodiimide
75. 1-(2-bromocyclohexyl)-3-phenylcarbodiimide
76. 1-(dichlorocyclohexyl)-3-phenylcarbodiimide
77. 1-(dibromocyclohexyl)-3-phenylcarbodiimide
78. 1-(2-iodocyclohexyl)-3-phenylcarbodiimide
79. 1-(2-fluorocyclohexyl)-3-phenylcarbodiimide
80. 1-(1-methylcyclohexyl)-3-phenylcarbodiimide
81. 1-(2-fluorocyclopentyl)-3-phenylcarbodiimide
82. 1-(3-iodocyclopentyl)-3-phenylcarbodiimide
83. 1-(5-chloro-2-norbornyl)-3-phenylcarbodiimide
84. 1-(5,6-dichloro-2-norbornyl)-3-phenylcarbodiimide
85. 1-(bromo-2-norbornyl)-3-phenylcarbodiimide
86. 1-(iodo-2-norbornyl)-3-phenylcarbodiimide
87. 1-(chloro-2-methylcyclohexyl)-3-phenylcarbodiimide
88. 1-(chloro-3-methyl-2-norbornyl)-3-phenylcarbodiimide
89. 1-cyclohexyl-3-m-tolylcarbodiimide
90. 1-(4-methylcyclohexyl)-3-m-tolylcarbodiimide
91. 1-cyclohexyl-3-o-tolylcarbodiimide
92. 1-(2-methylcyclohexylmethyl)-3-phenylcarbodiimide
93. 1-(cyclooctylmethyl)-3-phenylcarbodiimide
94. 1-(chlorocyclopentylmethyl)-3-m-tolylcarbodiimide
95. 1-(2-ethylcyclohexylmethyl)-3-p-tolylcarbodiimide
96. 1-(cyclohexylmethyl)-3-o-tolylcarbodiimide
97. 1-(cyclohexylmethyl)-3-m-tolylcarbodiimide
98. 1-(chlorocyclohexylmethyl)-3-phenylcarbodiimide
99. 1-(chlorocyclohexyl)-3-p-tolylcarbodiimide
100. 1-(3-methylcyclohexyl)-3-o-tolylcarbodiimide
101. 1-(2-methylcyclohexylmethyl)-3-o-tolylcarbodiimide
102. 1-(2-methylcyclohexylmethyl)-3-p-tolylcarbodiimide
103. 1-(2,4-dimethylcyclohexylmethyl)-3-m-tolylcarbodiimide
104. 1-(2,5-dimethylcyclohexylmethyl)-3-phenylcarbodiimide
105. 1-(3,4-dimethylcyclohexylmethyl)-3-phenylcarbodiimide
106. 1-(2-methyl-4-chlorocyclohexyl)-3-o-tolylcarbodiimide
107. 1-(3,4-dichlorocyclohexyl)-3-phenylcarbodiimide
108. 1-(2-methylcyclohexyl)-3-p-tolylcarbodiimide
109. 1-(2-methylcyclohexyl)-3-o-tolylcarbodiimide
110. 1-(4-methylcyclohexylmethyl)-3-phenylcarbodiimide
111. 1-(2-chlorocyclohexylmethyl)-3-phenylcarbodiimide
112. 1-(5,6-dichloronorbornylmethyl)-3-phenylcarbodiimide
113. 1-(chloronorbornylmethyl)-3-phenylcarbodiimide
114. 1-(cyclopentylmethyl)-3-phenylcarbodiimide
115. 1-(cycloheptylmethyl)-3-phenylcarbodiimide
116. 1-(2-ethylcyclohexyl)-3-phenylcarbodiimide
117. 1-(3-ethylcyclohexyl)-3-phenylcarbodiimide
118. 1-(2-ethylcyclohexyl)-3-m-tolylcarbodiimide
119. 1-(2-chloro-4-methylcyclohexyl)-3-phenylcarbodiimide
120. 1-(3,5-dimethylcyclohexyl)-3-phenylcarbodiimide
121. 1-(2,4-dimethylcyclohexyl)-3-p-tolylcarbodiimide
122. 1-(1-methylcyclohexyl)-3-m-tolylcarbodiimide
123. 1-(2-bromocyclooctylmethyl)-3-m-tolylcarbodiimide Example:—Continued
124. 1-(2-fluorocyclopentylmethyl)-3-m-tolylcarbodiimide
125. 1-(cyclohexylmethyl)-3-o-tolylcarbodiimide
126. 1-(2,4-dimethylcyclohexyl)-3-o-tolylcarbodiimide
127. 1-(2-iodocycloheptylmethyl)-3-m-tolylcarbodiimide
128. 1-(2-bromocyclohexylmethyl)-3-p-tolylcarbodiimide
129. 1-(o-fluorophenyl)-3-(2-methylcyclohexyl)carbodiimide
130. 1-(o-fluorophenyl)-3-cyclohexylcarbodiimide
131. 1-(o-fluorophenyl)-3-cycloheptylcarbodiimide
132. 1-(o-fluorophenyl)-3-norbornylcarbodiimide
133. 1-(o-fluorophenyl)-3-cyclohexylmethylcarbodiimide
134. 1-(o-fluorophenyl)-3-(2-fluorocyclohexyl)carbodiimide
135. 1-(o-fluorophenyl)-3-(4-chlorocyclohexyl)carbodiimide

I claim:

1. Method for retarding the growth of crabgrass comprising applying to the locus of said crabgrass, in an amount sufficient to retard the growth of said crabgrass, a compound of the formula

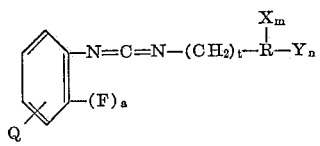

wherein

R is selected from the group consisting of saturated cycloalkyl of 5 through 8 carbon atoms and saturated bicycloalkyl of 7 through 8 carbon atoms;

X and Y are each separately selected from the group consisting of halogen, methyl and ethyl;

$a$, $m$, $n$ and $t$ are each separately selected from the group consisting of 0 and 1;

Q is selected from the group consisting of hydrogen and methyl; and with the limitation that when R is selected from the group consisting of cyclopentyl, cycloheptyl, cyclooctyl and bicycloalkyl, Q must be in the meta position and X and Y are selected from the group consisting of halogen and methyl.

2. Method for the selective control of crabgrass growing in the presence of perennial grasses comprising applying to the locus of said grasses, in an amount sufficient to retard the growth of said crabgrass, a compound of the formula

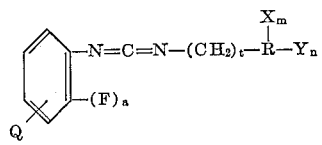

wherein

R is selected from the group consisting of saturated cycloalkyl of 5 through 8 carbon atoms and saturated bicycloalkyl of 7 through 8 carbon atoms;

X and Y are each separately selected from the group consisting of halogen, methyl and ethyl;

$a$, $m$, $n$ and $t$ are each separately selected from the group consisting of 0 and 1;

Q is selected from the group consisting of hydrogen and methyl; and with the limitation that when R is selected from the group consisting of cyclopentyl, cycloheptyl, cyclooctyl and bicycloalkyl, Q must be in the meta position and X and Y are selected from the group consisting of halogen and methyl.

3. Method of claim 2 wherein there is applied 1-(methylcyclohexyl)-3-phenylcarbodiimide.

4. Method of claim 2 wherein there is applied 1-(cycloheptyl)-3-phenylcarbodiimide.

5. Method of claim 2 wherein there is applied 1-(cyclooctyl)-3-phenylcarbodiimide.

6. Method of claim 2 wherein there is applied 1-(2-methylcyclohexyl)-3-phenylcarbodiimide.

7. Method of claim 2 wherein there is applied 1-(2-methylcyclohexyl)-3-o-fluorophenylcarbodiimide.

References Cited by the Examiner

UNITED STATES PATENTS 2,938,892   5/1960   Sheehan _____ 260—551 X

OTHER REFERENCES

Arndt et al.: German application, 1,121,402, printed January 4, 1962, Kl. 4,519/20, 6 pp. spec., no dwg., 71—2.3.

Derwent, Belgian Patents Report, No. 90 A, 610,280, Cl. 5, page 1, July 13, 1962.

LEWIS GOTTS, *Primary Examiner.*